United States Patent [19]
Ayle

[11] Patent Number: 5,673,648
[45] Date of Patent: Oct. 7, 1997

[54] ANIMAL LITTER BOX AND STORAGE DEVICE

[76] Inventor: Earl F. Ayle, 3170 W. Laredo St., Chandler, Ariz. 85226

[21] Appl. No.: 541,439

[22] Filed: Oct. 10, 1995

[51] Int. Cl.⁶ ........................................ A01K 1/035
[52] U.S. Cl. ........................................ 119/166
[58] Field of Search ........................... 119/163, 166

[56] References Cited

U.S. PATENT DOCUMENTS

| | | | |
|---|---|---|---|
| 3,908,597 | 9/1975 | Taylor | 119/166 |
| 4,120,264 | 10/1978 | Carter | 119/166 |
| 4,190,525 | 2/1980 | Menzel | 119/166 X |
| 4,325,325 | 4/1982 | Larter | 119/166 |
| 4,517,920 | 5/1985 | Yamamoto | 119/166 |
| 4,602,593 | 7/1986 | Gross | 119/166 |
| 4,616,598 | 10/1986 | Burniski et al. | 119/166 |
| 4,886,014 | 12/1989 | Sheriff | 119/166 |
| 5,499,610 | 3/1996 | Bruner et al. | 119/166 |

Primary Examiner—Robert P. Swiatek
Assistant Examiner—Elizabeth Shaw
Attorney, Agent, or Firm—Snell & Wilmer L.L.P.

[57] ABSTRACT

An animal litter and storage box device is presented which allows an operator to clean all solid animal waste from litter material with a simple two step motion. The operator has no contact with the animal waste and there are no substantial moving parts or complex motion patterns that are required to operate the device. The device includes a bottom tray, a cover member having a waste chute which fits over the bottom tray, and a slide rail separator contained within the device that is capable of separating animal waste from litter material. The animal waste and litter material mixture is moved through the slide rail separator by lifting one end of the device. The solid animal waste is separated by the slide rail separator and rolls into a waste storage bag attached to the waste chute. The reusable litter which passes through the slide rail separator is contained within the device. The device is lifted again to redistribute the cleaned litter. When the waste storage bag receives solid animal waste, the top of the waste storage bag closes thereby trapping the animal waste, and odors associated with the waste, in the bag.

20 Claims, 2 Drawing Sheets

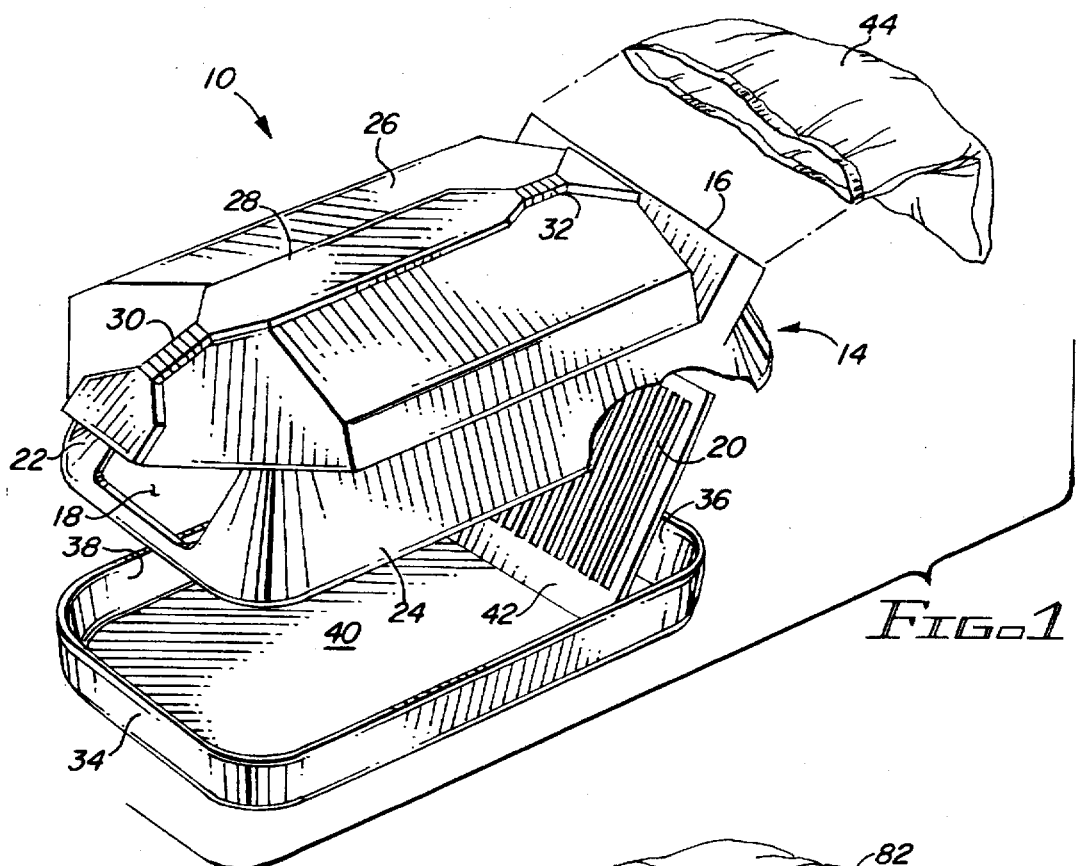
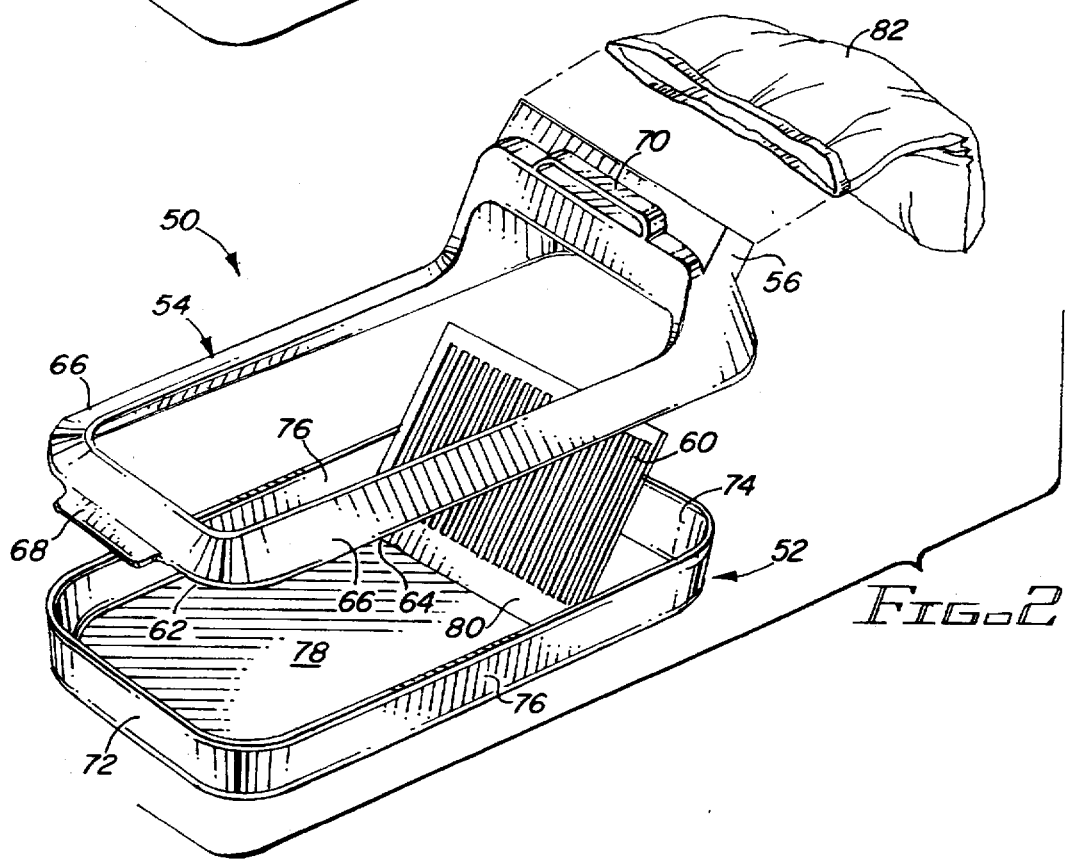

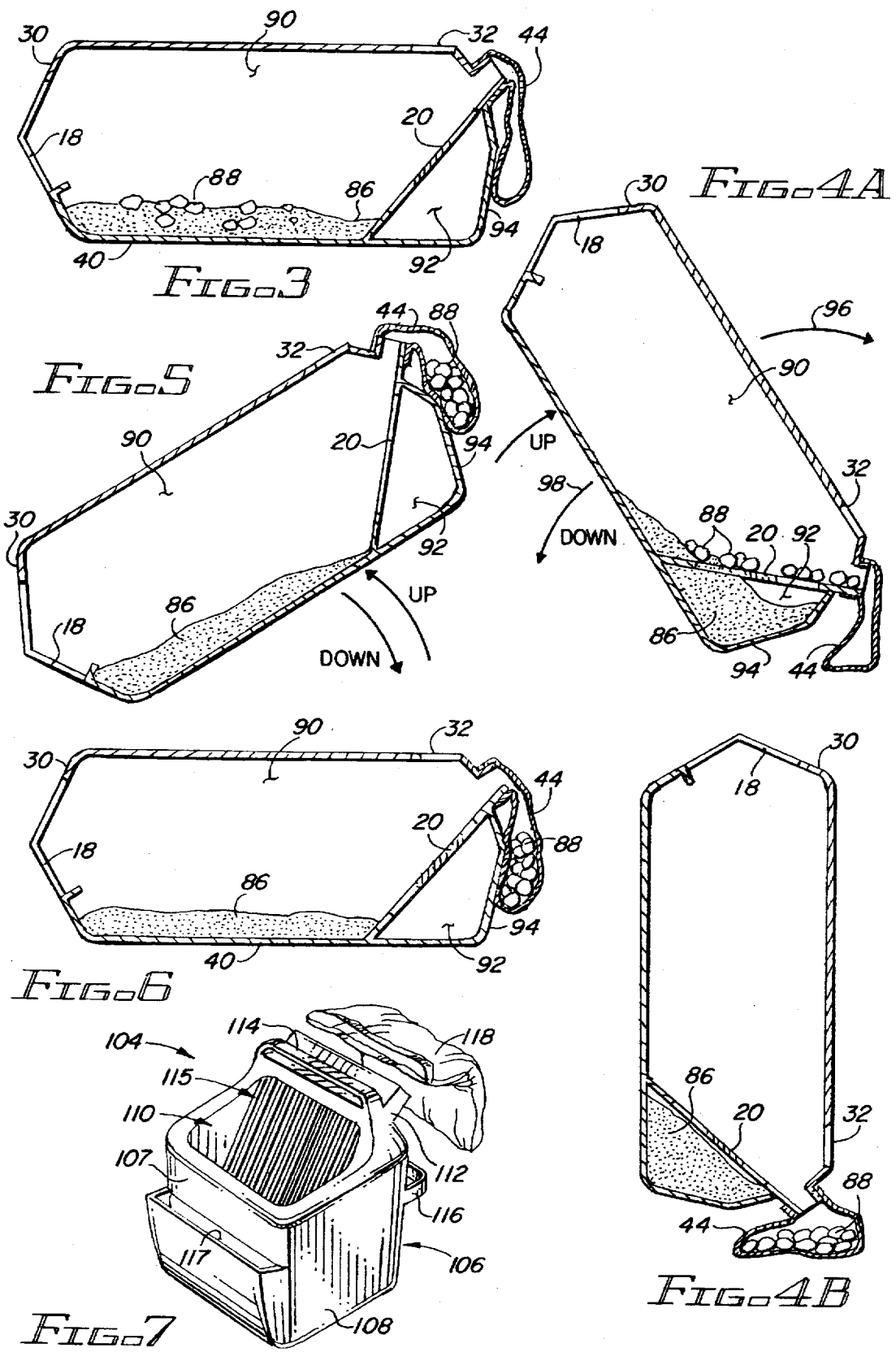

ANIMAL LITTER BOX AND STORAGE DEVICE

FIELD OF THE INVENTION

The present invention relates generally to an animal litter box and litter storage box. More particularly, the present invention relates to an animal litter box of simple construction which requires an easy two step motion to clean solid waste from the litter and replace the cleaned litter in the bottom of the litter box. Alternatively, the same construction of the animal litter box may be used to create a litter storage box which functions to clean and store the litter using the same method as the animal litter box.

BACKGROUND OF THE INVENTION

When animals are taken from their outdoor world to be studied, cared for, or maintained as pets, a new problem appears, namely, the need to dispose of their waste products. The use of a clean media for this purpose will be referred to as litter, meaning a material that is capable of covering and absorbing animal waste products. Animals from the small ferret to the family cat to the "King of the Beasts", the lion, which resides in the zoo or with the circus, must have proper care which includes the removal of their waste material.

Animal waste products can be dangerous to humans because insects, such as flies, can carry disease from animal waste and litter material to human contact areas, including food that is consumed by humans. Further, adults and children can be exposed to possible disease by handling infected animal waste when picking up the animal waste or sifting through litter to remove the animal waste. Finally, an unclean litter box may also put an animal at risk of being exposed to disease.

A litter type box can be cleaned by either discarding the entire mixture of litter and animal waste products or, alternatively, sifting through the litter to remove the animal waste products from the litter. Clumping litters have recently been developed to trap liquids, however, once the clumps have formed, they must be removed. The most economical alternative for animal waste removal is to use a litter that can be cleaned and reused several times over. However, this method requires additional labor in that one must separate the waste from the reusable materials. Further, this method results in exposing the individual cleaning the litter to unpleasant odors and contamination during the separation and disposal process.

A number of patented devices exist for separating solid type waste from reusable litter. These devices utilize the physical characteristics of the litter particles and waste products in carrying out the separation. In that the litter particles are smaller in size than the waste products, the separation is completed by using screens or perforations that are large enough to allow the reusable litter to pass through easily yet small enough to prevent the waste products from passing therethrough.

For example, U.S. Pat. No. 4,325,325 issued to Larter comprises two litter boxes which are connected together with a removable perforated separator plate. In order to clean the reusable litter, the boxes are inverted and the separator plate acts as a sieve for the litter and a barrier for the waste products. The waste products are then removed from the surface of the separator plate. U.S. Pat. No. 3,908,597 issued to Taylor discloses double boxes each having a perforated bottom and a slidable solid divider that can be removed to allow the clean litter to flow from one box to another. The top box is then removed to dispose of the animal waste and the top box is replaced with a cap.

Other patents, such as U.S. Pat. No. 4,602,593 issued to Gross and U.S. Pat. No. 4,616,598 issued to Burniski comprise devices comprise moveable parts which open and close perforations in the floor of the device to separate the animal waste. Finally, U.S. Pat. No. 4,886,014 issued to Sheriff describes a device which utilizes a series of motions to move the mixture of litter and animal waste products to a channel located on one side of a generally rectangular box. First, the box is rotated approximately 45° on its side in order to fill the side channel. Next, the front end is lifted upward and the mixture moves toward the back of the side channel and into a back channel of the box. When the box is lowered to the floor, the mixture falls onto a screen that separates the waste from the cleaned litter. Finally, the box is rotated approximately 45° in the opposite direction in order to flow the waste into a bag. This device requires a complex motion pattern which may result in some waste not following the flow pattern.

Accordingly, there is a need for a simple animal litter box design that is reliable, fast, low cost, and easy to operate. The design must not expose the operator to any waste material during disposal. Further, it must be pleasing for the animal to use and capable of maintaining a healthful environment.

SUMMARY OF THE INVENTION

It is a principle object of the present invention to provide an animal litter and storage box which is capable of separating animal waste products from litter material.

It is a further object of the present invention to provide an animal litter and storage box that protects the individual utilizing the device from being exposed to animal waste or contaminated surfaces during the cleaning cycle.

It is yet a further object of the present invention to provide an animal litter and storage box that is simple to operate and that requires a minimum amount of time to operate when carrying out its function of separating animal waste from litter material.

It is still a further object of the present invention to provide a reliable and low cost animal litter and storage box which is capable of separating animal waste from litter material.

Briefly, the animal litter and storage box which is capable of separating animal waste from litter material includes a bottom tray, a top cover having a waste chute located at one of its ends where the top cover fits directly over the bottom tray, and a slide rail separator positioned within the interior of the animal litter and storage box. The top cover may have an open or closed top. Further, in order to clean the litter material contained within the box, a waste storage bag is attached to the exterior of the waste chute in order to collect the animal waste. Also, the animal litter storage box embodiment of the device includes a pour spout located on its front wall for distributing the cleaned litter material.

All animal waste is separated by the slide rail separator and then transferred into the bag by movement of the device in a continuous motion in a given direction. The cleaning cycle is simple with one direct lift or rocking motion depending upon the embodiment of the device. For example, with the litter box embodiment, separation of the animal waste from the litter material is carried out with one direct lift motion. Further, with the storage box embodiment of the device, the separation of the animal waste from the litter material is accomplished by rocking the device backwards in one motion after pouring the litter and animal waste mixture on top of the slide rail separator. Both embodiments of the device are reliable with no substantial moving parts that can jam or break. Also, the cleaning cycle is swift and easy thereby enabling an animal's litter box to be cleaned at each feeding or as often as one desires.

The objects and advantages of this invention will appear more fully from the following more detailed description of the preferred embodiments of the invention made in conjunction with the accompanying drawings.

BRIEF DESCRIPTION OF THE DRAWINGS

FIG. 1 is an exploded perspective view of a first closed top embodiment of the animal litter box of the present invention.

FIG. 2 is an exploded perspective view of a second open top embodiment of the animal litter box of the present invention.

FIG. 3 is longitudinal cross section of the animal litter box of the present invention shown with animal waste and litter material prior to cleaning.

FIG. 4A is a longitudinal cross section of the animal litter box of the present invention shown during step one of the cleaning process wherein the animal waste is separated from the litter material via the slide rail separator.

FIG. 4B is a longitudinal cross section of the animal litter box of the present invention shown in the vertical position after separation of the animal waste from the litter material and movement of the animal waste into the waste storage bag.

FIG. 5 is a longitudinal cross section of the animal litter box of the present invention shown during step two of the cleaning process wherein the litter material is redistributed along the floor of the litter box by an up and down movement of the device.

FIG. 6 is a longitudinal cross section of the animal litter box of the present invention shown after the cleaning process has been completed and prior to being used again by an animal.

FIG. 7 is a perspective view of the animal litter storage box embodiment of the present invention which is capable of separating animal waste from litter material and redistribution of the cleaned litter material into a litter box.

DETAILED DESCRIPTION OF THE PREFERRED EMBODIMENTS

FIG. 1 illustrates an exploded view of the closed end embodiment 10 of the animal litter box of the present invention. Generally, the closed end embodiment 10 of the animal litter box includes a bottom tray 12, a top cover member 14 that fits over the bottom tray 12 which comprises a waste chute 16 and an opening 18 for an animal to enter the litter box, and a grate or sieve member in the form of a slide rail separator 20. The top cover member 14 includes a front end 22, a back end (not shown), opposing side ends 24, and a top 26. The animal entrance opening 18 is located in the front end 22 of the top cover member 14 and the waste chute 16 protrudes from the top of the back end of the top cover member. The waste chute 16 is elongated such that it extends across the width of the top cover member 14. The top cover member 14 further comprises a top roof ridge reinforcement 26 located across the top length of the top cover member 14 which includes a front handle 30 and a back handle 32.

The bottom tray 12 includes a front end 34, a back end 36, opposing side ends 38, and a planar bottom 40. The slide rail separator 20 comprises a planar grate or sieve having a solid wall portion 42. The slide rail separator 20 is positioned within the animal litter box at an angle such that its solid wall portion 42 is located adjacent to the planar bottom 40 of the bottom tray 12 and its end opposite the solid wall portion is located adjacent the interior of the back end of the top cover member 14 near the waste chute 16. The removable slide rail separator 20 is preferably stationary but may also be slidable along the planar bottom 40 of the bottom tray 12 at its solid wall portion 42 end. The slidable embodiment of the slide rail separator 20 may be hingedly attached to the back end of either the top cover member 14 or the bottom tray 12. The top cover member 14 is fitted directly on top of the bottom tray 12 and a waste storage bag 44 is attached to the exterior end of the waste chute 16.

The animal litter box of the present invention may have any basic shape provided that the slide rail separator 20 extends to a waste chute and thereby separates off an additional internal compartment within the litter box for retaining the litter material once it passes through the slide rail separator 20. The animal litter box may be constructed of a variety of metallic and nonmetallic materials such as plastics for smaller configurations of the device, and aluminum or fiberglass for larger configurations of the device which are capable of accommodating large animals such as zoo animals. The preferred embodiment is preferably made of material suitable for injection molding. The spacing of the bars or openings contained within the grate or sieve which comprises the slide rail separator 20 will depend upon the size of the animal, which determines the size of the animal waste, and the size of the litter material. The slide rail separator 20 should be configured such that only the litter material can pass through it, thereby separating the animal waste from the litter material.

Turning now to FIG. 2, there is shown an exploded perspective view of an open top embodiment 50 of the animal litter box of the present invention. Like the closed end embodiment 10, the open end embodiment 50 includes a bottom tray 52, a top cover member 54 that fits over the bottom tray 52 which comprises a waste chute 56, and a slide rail separator 60. The top cover member 54 includes a front end 62, a back end (not shown), opposing side ends 64, and a lip member 66 which extends around the perimeter of the top edge of the top cover member 54 thereby forming a ledge which helps to contain the litter material and animal waste within the bottom tray 52. The top cover member 54 further comprises a front handle 68 and back handle 70. The front handle 68 also functions as a step for small animals to enter the animal litter box.

Further, like the bottom tray 12 of the closed end embodiment 10 of the present invention, the bottom tray 52 of the open end embodiment 50 of the present invention includes a front end 72, a back end 74, opposing side ends 76, and a planar bottom 78. The slide rail separator 60 comprises the same configuration as the slide rail separator 20 described with respect to the closed end embodiment 10. The slide rail separator 60 constitutes a planar grate or sieve having a solid wall portion 80 along its end which is located adjacent to the planar bottom 78 of the bottom tray 52 when properly positioned within the animal litter box 50. The removable slide rail separator 60 may be either stationary or slidable along the planar bottom 78 of the bottom tray 52. The slidable embodiment of the slide rail separator 60 may be hingedly attached to the back of either the top cover member 54 or the bottom tray 52. During use, the top cover member 54 is fitted directly over the bottom tray 52 and a waste storage bag is attached to the exterior end of the waste chute 56.

Operation of the Closed Top Embodiment

FIG. 3 shows a longitudinal cross section of the closed top animal litter box 10 of the present invention after is has been utilized for depositing and containing animal waste. Both litter material 86 and animal waste 88 are contained within the animal litter box 10 on the planar bottom 40 of the bottom tray 12. The slide rail separator 20 divides the interior of the animal litter box 10 into two compartments; one large compartment 90 which retains the majority of the litter material and the animal waste, and one small compartment 92 which functions to temporarily store the litter material 86 once it has been separated from the animal waste 88. Prior to cleaning, the litter material 86 and the animal waste 88 are contained within the large compartment 90.

Next, as depicted in FIGS. 4A and 4B, the animal litter box 10 is manipulated to carry out Step One of the cleaning process. In Step One, the front handle 30 of the animal litter box 10 is lifted upward toward the back end 94 of the bottom tray 12 as shown by the first arrow 96. As the back end 94 is tipped toward the ground, the litter material 86 passes across the solid wall portion 42 of the slide rail separator 20 and onto the grate or sieve portion of the separator 20. The litter material 86 passes through the grate or sieve portion of the slide rail separator 20 and into the small compartment 92. Meanwhile, the animal waste slides across the surface of the slide rail separator 20 but does not pass through the separator 20.

Upon tilting the back end 94 of the bottom tray 12 to a point such that it lies parallel to the ground, as shown in FIG. 4B, the animal waste 88 slides all the way across the slide rail separator 20 and passes through the waste chute 16 and into the waste storage bag 44. The animal litter box 10 is then returned to its starting position in which the planar bottom 40 of the bottom tray 12 lies planar to the ground as shown by the second arrow 98. This back and forth rocking motion comprising Step One results in the animal waste 88 being deposited within the waste storage bag 44 and the cleaned, or separated litter, residing in the small compartment 92. The waste storage bag 44 seals off the animal waste 88 from the interior of the animal litter box 10 when the animal litter box 10 is returned to its original starting position.

In order to return the cleaned and separated litter back to the large compartment 90 which is used by the animal(s) to deposit waste, Step Two of the cleaning process is carried out. In Step Two of the cleaning process, the back handle 32 of the animal litter box 10 is lifted upward and backward toward the front end 34 of the bottom tray 12 as shown by the third arrow 100. During this lift, most all of the separated litter material 86 contained within the small compartment 92 passes back through the slide rail separator 20 and into the large compartment 90. The closed top animal litter box 10 is then returned to its original starting position, as evidenced by the fourth arrow 102, wherein the planar bottom 40 of the bottom tray 12 lies planar to the ground. Due to the configuration of the waste chute 16, the animal waste 88 remains sealed off from the interior of the animal litter box 10 by the waste storage bag 44 during the forward and back rocking motions of Step Two.

The end product of the cleaning process is illustrated in FIG. 6. FIG. 6 shows a cleaned animal litter box 10 of the present invention which has been cleaned by following the above outlined cleaning process steps. The separated and cleaned litter material 86 is contained within the large compartment 90 on the planar bottom 40 of the bottom tray 12 of the animal litter box 10. The animal waste 88 is contained within the waste storage bag 44 which is sealed off from the interior of the animal litter box 10. The waste storage bag 44 is then removed from the animal litter box 10 and disposed. Following its removal, a new waste storage bag is placed on the exterior of the waste chute 16.

Storage Box Embodiment

FIG. 7 shows a perspective view of the animal litter storage box embodiment 104 of the present invention. The animal litter storage box 104 functions to clean, store, and distribute litter material. The animal litter storage box 104 comprises a litter bucket 106 having a front wall 107, a back wall (not shown), opposing side walls 108, and a planar bottom (not shown). A lip member 110 extends around the periphery of the top edges of the wall members. The animal litter storage box 104 further comprises a waste chute 112 attached to the top back wall of the litter bucket 106, a top handle 114 attached to the waste chute 112, a slide rail separator 115 positioned within the litter bucket 106, a back handle 116 attached to the exterior of a mid portion of the back wall of the litter bucket 106, and a pour spout 117 attached to the front wall 107 of the litter bucket 106.

The interior of the pour spout 117 is continuous with the interior of the litter bucket 106 so that litter material contained within the litter bucket 106 can be distributed by pouring it from the pour spout 117. In order to use the animal litter storage box 104, a combination of litter material and animal waste is poured into the litter bucket 106 on top of the slide rail separator 115. The litter material passes through the slide rail separator 115 and the animal waste is retained on the top of the slide rail separator 115. The animal litter storage box 104 is then tipped backwards so that the back wall of the litter bucket 106 approaches a parallel planar position with the ground. During this movement, the animal waste contained on top of the slide rail separator 115 passes across the top of the slide rail separator, through the waste chute 112 and into a waste storage bag 118 which is attached to the exterior of the waste chute 112. The slide rail separator 115 is preferably stationary within the litter bucket 106 but can be removed for easy cleaning of the device.

After the animal waste has been delivered into the waste storage bag 118, the animal litter storage box 104 is returned to its original position in which the planar bottom of the litter bucket 106 is positioned parallel to the ground. The separated and cleaned litter may then be distributed by lifting the litter bucket 106 forward so that the cleaned litter material passes into and out of the pour spout 117. The back handle 116 facilitates the lifting of the litter bucket 106 to accomplish the distribution of the cleaned litter material into a litter box. Like the litter box embodiments of the device, the waste storage bag 118 seals the waste material off from the interior of the litter bucket 106.

While preferred embodiments of the invention have been shown in the drawings and described, since variations in the preferred forms will be apparent to those skilled in the art, the invention should not be construed as limited to the specific forms shown and described, but instead is as set forth in the following claims.

I claim:

1. An animal litter box device comprising:
    a) a bottom tray having front and back ends, first and second side ends, and a planar bottom;
    b) a top cover member having a first end, a back end, first and second side ends and a waste chute contained within the back end wherein said top cover member fits directly on top of said bottom tray; and
    c) a slide rail separator capable of separating animal waste from litter material, said separator being positioned at an angle against the back end of said top cover member such that it extends downward from said waste chute.

2. The device of claim 1 further comprising a waste storage bag attached to an end of the waste chute at the exterior of the top cover member.

3. The device of claim 1 wherein said top cover member further comprises a closed top and an opening within said front end to enable an animal to enter therethrough.

4. The device of claim 1 wherein said top cover member further comprises front and back handles located near the front and back ends of the top cover member, respectively.

5. The device of claim 3 wherein said closed top comprises front and back handles located near the front and back ends of the top cover member, respectively.

6. The device of claim 1 wherein said waste chute is positioned at approximately a 60° angle relative to the bottom of said bottom tray.

7. The device of claim 1 wherein said slide rail separator is positioned at an angle within a range of 20° to 90° from the planar bottom of said bottom tray.

8. The device of claim 1 wherein said slide rail separator comprises a plurality of vertically disposed parallel bar members.

9. The device of claim 8 wherein a bottom end of said slide rail separator lying adjacent the planar bottom of said bottom tray comprises a solid wall portion through which no material can pass therethrough.

10. An animal litter storage and cleaning device comprising:
   a) a bin having an open top end, a closed bottom end, a front side, a back side, opposite side ends, and a waste chute extending from a top of said back side;
   b) an elongated spout connected to the front side of said bin such that an interior of said spout opens into an interior of said bin; and
   c) a slide rail separator capable of separating animal waste from litter material, said separator being positioned within an interior of said bin.

11. The device of claim 10 further comprising a back handle extending from the back side of said bin.

12. The device of claim 11 further comprising a top handle connected to said waste chute.

13. The device of claim 10 further comprising a waste storage bag attached to an end of said waste chute.

14. The device of claim 10 wherein said slide rail separator comprises a plurality of bar members which are separated from one another by a predetermined width.

15. The device of claim 10 wherein said bin further comprises a series of top edges which are positioned above said slide rail separator to facilitate a temporary containment of the animal waste after separation.

16. The device of claim 10 wherein said waste chute is positioned at approximately a 60° angle relative to the bottom of said bin.

17. The device of claim 10 wherein said slide rail separator is positioned at an angle within a range of 20° to 90° from the bottom of said bin.

18. The device of claim 10 wherein a bottom end of said slide rail separator lying adjacent the bottom of said bin comprises a solid wall portion through which no material can pass therethrough.

19. A method for separating animal waste from litter material comprising the steps of:
   a) lifting a front end of a container having front and back ends, opposite side ends, a planar bottom, and a slide rail separator positioned within an interior of said container such that it separates said interior into two compartments, until the litter material has passed through the separator;
   b) transferring the animal waste material through a chute connected to the back end of the container and into a waste storage bag by continuing to lift the front end of the container until the front and back ends are near vertical alignment with one another;
   c) returning the container to the container's starting position such that the planar bottom of the container lies adjacent and parallel to the ground; and
   d) lifting the back end of the container to redistribute the cleaned litter material throughout the planar bottom of the container by forcing the cleaned litter material back under the slide rail separator.

20. The method of claim 19 further comprising the step of pouring the cleaned litter material through a spout located at the front end of the container.

* * * * *